Figure 1:
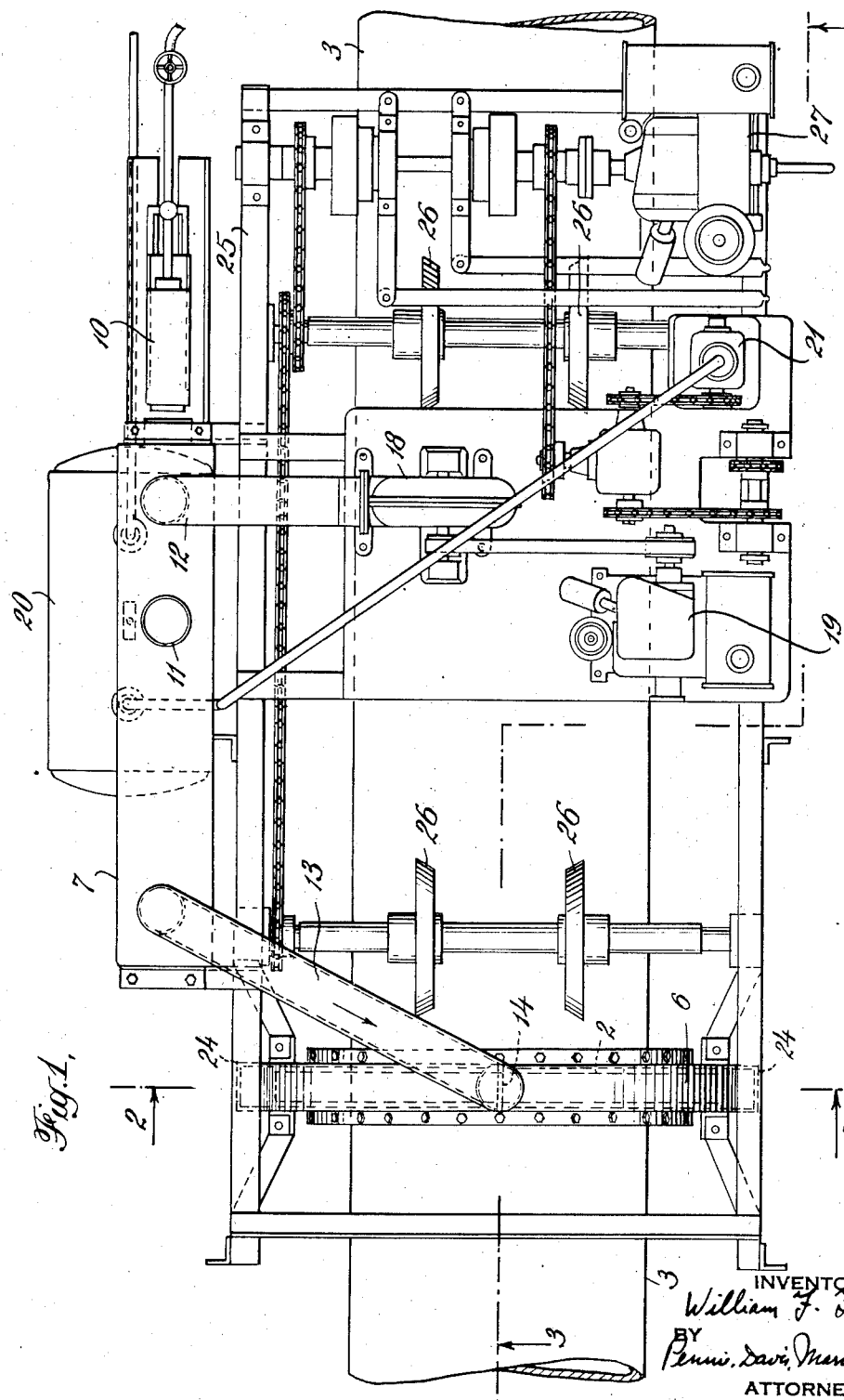

June 30, 1942.  W. F. FOCHA  2,288,316
APPARATUS FOR COATING PIPE
Filed April 13, 1940  3 Sheets-Sheet 1

INVENTOR
William F. Focha
BY
Pennie, Davis, Marvin, Edmonds
ATTORNEYS

June 30, 1942.  W. F. FOCHA  2,288,316
APPARATUS FOR COATING PIPE
Filed April 13, 1940  3 Sheets-Sheet 2

INVENTOR
William F. Focha
BY
Pennie, Davis, Marvin, Edmonds
ATTORNEYS

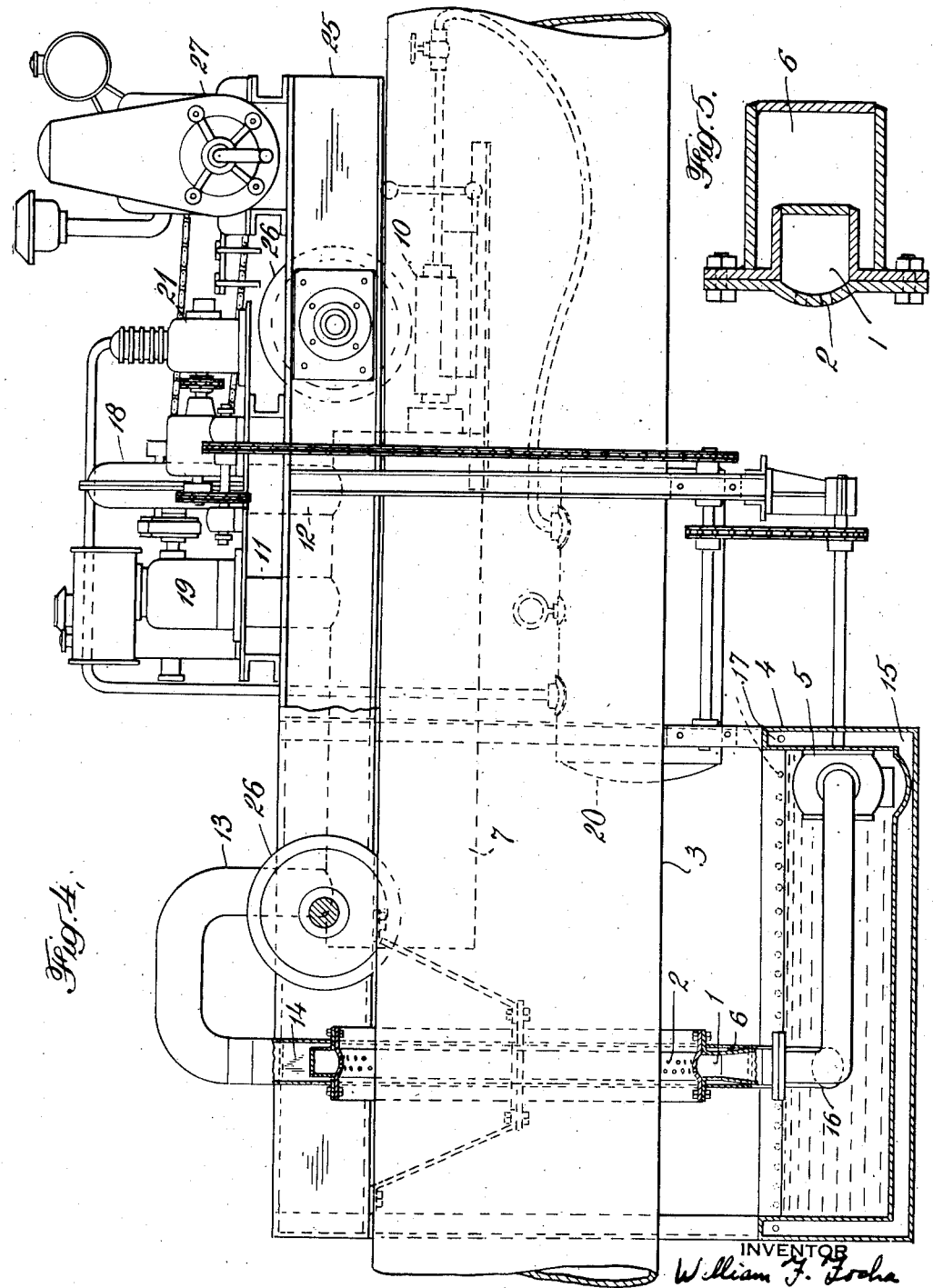

Patented June 30, 1942

2,288,316

UNITED STATES PATENT OFFICE 2,288,316

APPARATUS FOR COATING PIPE

William Francis Focha, Westfield, N. J., assignor to Wailes, Dove-Hermiston Corporation, a corporation of New York Application April 13, 1940, Serial No. 329,439

8 Claims. (Cl. 91—44)

This invention relates to the coating of pipe with bitumen. Oil, gas, and water pipe, which are laid in the ground, are commonly coated exteriorly with bitumen to protect them from the corrosive action of water and soil acids. Such coatings, to be effective and to pass the inspections to which they are subjected, must be free from carbon spots, entrapped air or bare spots. Ample bitumen must be used, properly applied. On the other hand, economy demands that the coating be applied uniformly and of a thickness not greater than necessary, having regard for the requirements of the particular job. Pipe lines, particularly oil pipe lines, are usually many miles in length so that any excess of bitumen beyond absolute requirements will materially increase the cost of the operation.

To meet these specifications is not easy and so far as I know has never been done heretofore. As the coating hardens well above atmospheric temperature, it must be applied hot and maintained in a liquid condition, and at the proper temperature until the instant of application. The temperature at application is an important factor determining the thickness of the coat— the hotter the bitumen the more of it drains off before the residue hardens; hence the thinner the coating. If, however, too much heat is applied in an attempt to maintain the requisite liquidity, carbonization may result and carbonized spots appear in the coating. The coating is usually applied in the field after the pipe sections have been united either by welding or coupling, and must, therefore, completely cover the welds, which are frequently rough, the couplings, the flanges of which protect radially from surface the pipe a distance of several inches, and also frequently patches and patch bolts. This has presented grave difficulties because the methods heretofore employed have involved rubbing or wiping the pipe. Such sluggish methods have also resulted in entrapping air bubbles between the rapidly setting bitumen and the pipe, thus producing defective spots. It has also been impossible to achieve uniformity of coating by the methods heretofore employed.

It is the object of the present invention to improve upon the apparatuses formerly used in coating pipe with bitumen and to provide means for applying a coating of controllable and uniform thickness, free of carbon spots, air pockets and other defects, and capable of coating welded or coupled pipe without interruption and with uniformity over the welds and couplings.

I have attained this object by applying the liquid bitumen in radial jets impinging upon the pipe with sufficient pressure to prevent entrapment of air, while maintaining the bitumen at the proper temperature without local application of heat. The apparatus which I use in performing this operation comprises a jet ring encircling the pipe and spaced from it far enough to permit passage over couplings. This ring is made up of an annular duct, provided with a series of jet orifices extending about its inner face, and enclosed at its sides and outer face by an annular air-jacket or heating chamber. The hot liquid bitumen is pumped under pressure from an open air-jacketed sump below the ring, and, through the jet orifices, against the pipe in a plurality of fine streams, the excess draining back into the sump. The molten bitumen is poured into the sump at the desired temperature and viscosity and maintained in that condition by means of hot air forced through the annular air-jacket and thence through the air-jacket of the sump. The ring and its connections are supported upon a carriage designed to move upon the pipe being coated, or in the alternative, the ring may be fixed and pipe sections moved through it.

Figure 2:
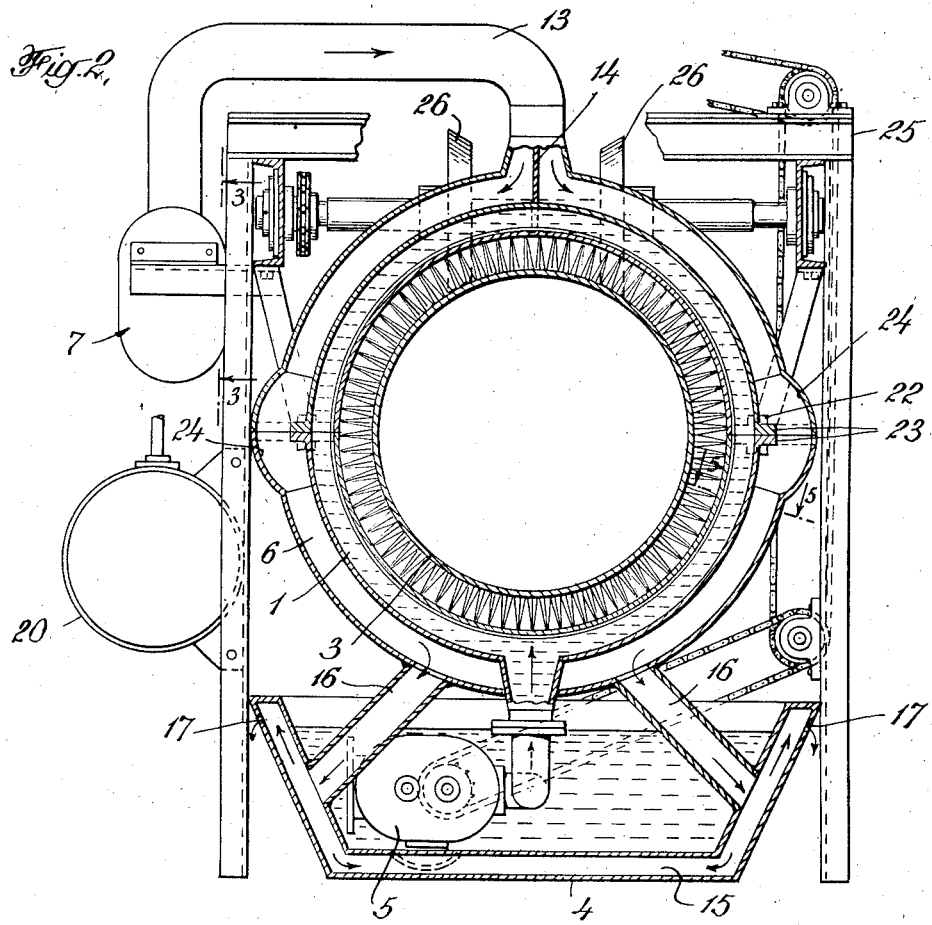
Figure 3:
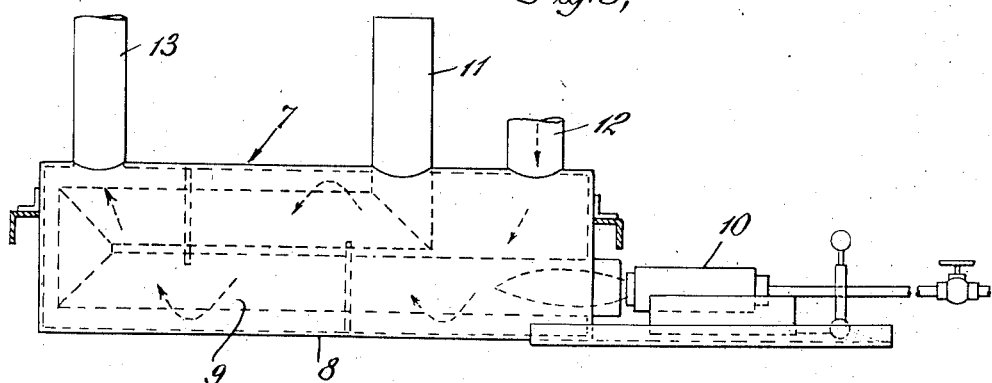

In the accompanying drawings I have illustrated a preferred embodiment of my invention. In these drawings, Figure 1 is a plan view of the entire apparatus including the carriage which supports the jet ring and moves it along the pipe being coated; Figure 2 is a transverse vertical section through the jet ring and its sump taken along the line 2—2 of Figure 1; Figure 3 is a detailed view of a furnace employed for heating the hot air which is passed through the air-jackets of the ring and the sump; Figure 4 is an elevation of the carriage showing the ring and sump in section, and Figure 5 is an enlarged sectional detail of the jet ring taken along line 5—5 of Figure 2.

The jet ring which constitutes the ultimate tool of the machine is shown best in Figures 2, 4 and 5, to which I shall now refer. At the core of the ring is an annular duct 1 which encircles the pipe and is provided on its inner face with a plurality of orifices 2 which extend around the circumference of the ring. Liquid bitumen pumped into the duct is forced through the orifices 2 in radial jets which impinge upon the face of the pipe 3 substantially normal to its cylindrical surface. In order to get a more thorough distribution of the coating, I preferably use two rows of orifices, the individual members of which are staggered relative to each other. As shown in Figure 5 the axes of the orifices are inclined very slightly to the normal for the purpose of obtaining a wider distribution of the coating. A sump 4 is mounted immediately below the jet ring. Hot liquid bitumen, which has been melted elsewhere, is poured into this sump and pumped thence through the annular duct 1, and through the orifices 2 against the pipe, the excess draining back into the sump. A pump 5, mounted within the sump effects this circulation.

The sides and back of the bitumen duct 1 are enclosed within an air-jacket 6 by means of which hot air is brought into contact with three sides of the duct and maintains the bitumen within it at the desired temperature and liquidity. The hot air used for this purpose is heated in a small furnace 7, shown in Figure 3. This furnace comprises an oval jacket 8, housing a fire tube 9 through which pass flame and hot gases from an oil burner 10, venting to the atmosphere through an exhaust pipe 11. Air enters the jacket 8 through duct 12, follows a tortuous course about the fire tube 9, emerges through duct 13 and passes thence into the hot-air jacket 6 of the jet ring, a baffle 14 splitting the air into two streams as it enters the ring. The sump 4, like the jet ring, is provided with an air-jacket 15 connected to the air-jacket 6 by means of ducts 16. The hot air from the jacket 6 thus passes downward through the ducts 16 into the air-jacket 15 of the sump, emerging ultimately into the atmosphere through small openings 17 in the side walls of the sump. Air is forced through the furnace and the air-jackets by means of a blower 18 connected to the duct 12 and driven by means of a small gas engine 19. The passage of hot air through the air-jackets not only maintains the bitumen in its original liquid state, thus making control of the thickness of the coating possible, but it also makes feasible the use of a jet ring at all. In the absence of some positive means for maintaining the bitumen hot, the small jet orifices would soon clog. Fuel for the oil burner 10 is carried in a tank 20 and forced to the burner by compressed air supplied by a compressor 21.

In order that the jet ring may be assembled and dis-assembled laterally of the pipe, it is made in separable sections, two being the preferred number. These sections are united by means of bolts 22 extending through flanges 23. As these flanges extend across the air-jacket 6, and would thus interfere with the free circulation of hot air, the jacket is enlarged at the points 24 to provide uninterrupted passage for the hot air around the flanges.

The jet ring and its sump, the hot-air furnace, the blower, the oil tank and the compressor are all mounted upon a carriage 25 supported in turn and driven by two pairs of wheels 26 designed to run upon the pipe as a trackway. A gas engine 27, mounted upon the carriage serves as a source of power for all parts of the apparatus, except the blower 18 which is shown separately driven. The application of power to the various moving parts will be clear from a study of Figures 1 and 4, without further detailed description.

The apparatus described is particularly adapted for coating pipe lines made up of welded sections, the carriage rolling uninterruptedly along the line with the jet ring at its rear. No matter how rough a weld may be, the bitumen forced against it from the jet ring coats it uniformly. The force with which the jets strike the pipe make impossible the entrapment of any air. This method of application results not only in a coating free from defects, but one of controllable uniformity. The only part of the coating which is not of uniform thickness with the rest is that on the underside of the pipe. There, through a zone of several degrees, the drip from the jets gathers.

If the pipe to be coated is made up of sections joined by means of Dresser couplings, ramps or other means will have to be provided to allow the wheels 25 to pass the flanges of the couplings. The jet ring, however, will pass the flanges without difficulty, and will uniformly coat them. The maximum width of a Dresser coupling flange is about two inches, hence by making the inner diameter of my jet ring about four and one-half inches greater than the external diameter of the pipe being coated, I provide a clearance of two and one-half inches which is ample to permit the ring to ride over any coupling, even when the carriage must be raised by ramps.

The term "bitumen" as used in this specification and in the appended claims is intended to cover any bituminous or asphaltic enamel commonly used for pipe coating. Such enamels melt between 225 and 240° F. I have found it advantageous to apply them between 450 and 460° F., and to maintain them at this temperature until the instant of application. It is understood, of course, that the pipe is suitably primed before the application of the bitumen.

I claim:

1. Apparatus for coating pipe with hot liquid bitumen which comprises an annular duct, a plurality of orifices spaced around the inner face of the duct, means for forcing hot liquid bitumen through the orifices and against the pipe in a plurality of radial jets, a jacket about the duct, and means for passing a heating fluid through the jacket for keeping the bitumen in the duct hot.

2. Apparatus for coating pipe with hot liquid bitumen which comprises an annular duct, a plurality of orifices spaced around the inner face of the duct, means for forcing liquid bitumen through the orifices and against the pipe in a plurality of radial jets, an air-jacket about the duct and means for passing hot air through the air-jacket.

3. Apparatus for coating pipe with hot liquid bitumen which comprises an annular duct, a plurality of orifices spaced around the duct, a sump below the duct, means for forcing liquid bitumen from the sump into the duct, through the orifices and against the pipe in a plurality of jets, air-jackets about the duct and the sump and means for passing hot air through the air-jackets.

4. Apparatus for coating pipe with hot liquid bitumen which comprises an annular duct encircling the pipe, a plurality of orifices spaced around the duct, a sump below the duct, a pump for forcing hot liquid bitumen from the sump into the duct, through the orifices and against the pipe in a plurality of jets, air-jackets about the duct and sump, a hot-air furnace, a blower for forcing air through the furnace and air-jackets, and a carriage on which the duct, sump and furnace are mounted for movement along the pipe being coated.

5. A jet ring for coating pipe with liquid bitumen which comprises an annular duct for the bitumen provided on its inner face with a plurality of orifices spaced around its periphery and an air-jacket enclosing the sides and back of the duct.

6. A jet ring for coating pipe with liquid bitumen which comprises an annular duct for the bitumen provided on its inner face with a plurality of orifices spaced around it periphery, and an air-jacket enclosing the sides and back of the duct, the ring being made up of separable sections.

7. A jet ring for coating pipe with liquid bitumen which comprises an annular duct for the bitumen provided on its inner face with two rows of orifices the individual members of which are spaced circumferentially around the duct, the axis of each orifice being inclined outwardly from a median plane passing between the two rows.

8. Apparatus for coating pipe with hot liquid bitumen which comprises an annular duct, a plurality of orifices spaced around the duct, means for forcing hot liquid bitumen through the orifices and against the pipe in a plurality of jets, a jacket about the duct, and means for passing a heating fluid through the jacket for keeping the bitumen in the duct hot.

WILLIAM FRANCIS FOCHA.